US012692965B2

(12) United States Patent
Kim et al.

(10) Patent No.: US 12,692,965 B2
(45) Date of Patent: Jul. 28, 2026

(54) BRANCH TEE FOR SPRINKLER PIPES CONTROLLING WATER STREAM AUTOMATICALLY AND SPRINKLER PIPING SYSTEM HAVING THE SAME

(71) Applicant: Jin Tai Kim, Seoul (KR)

(72) Inventors: Jin Tai Kim, Seoul (KR); Seung Yun Kim, Seoul (KR); Song Yi Kim, Seoul (KR)

( * ) Notice: Subject to any disclaimer, the term of this patent is extended or adjusted under 35 U.S.C. 154(b) by 49 days.

(21) Appl. No.: 18/690,235

(22) PCT Filed: Sep. 6, 2022

(86) PCT No.: PCT/KR2022/013391
§ 371 (c)(1),
(2) Date: Oct. 22, 2024

(87) PCT Pub. No.: WO2023/038409
PCT Pub. Date: Mar. 16, 2023

(65) Prior Publication Data
US 2025/0043897 A1     Feb. 6, 2025

(30) Foreign Application Priority Data

Sep. 8, 2021   (KR) ........................ 10-2021-0119467
Jun. 7, 2022   (KR) ........................ 10-2022-0069018

(51) Int. Cl.
*F16K 11/04*        (2006.01)
*A62C 35/68*        (2006.01)
*F16L 41/02*        (2006.01)

(52) U.S. Cl.
CPC ............ *F16L 41/021* (2013.01); *A62C 35/68* (2013.01); *F16K 11/04* (2013.01)

(58) Field of Classification Search
CPC ... F16K 11/04; F16K 17/0473; B05B 1/3006; F16L 41/021
See application file for complete search history.

(56) References Cited

U.S. PATENT DOCUMENTS 2,360,816 A * 10/1944 Pasco .................. F16K 17/0473
                                                    251/33
4,941,502 A     7/1990 Loos et al.
(Continued)

FOREIGN PATENT DOCUMENTS

CN       201283179 Y     8/2009
CN       105972222 A     9/2016
(Continued)

OTHER PUBLICATIONS

International Search Report and Written Opinion for Application No. PCT/KR2022/013391, mailed Dec. 21, 2022.
(Continued)

*Primary Examiner* — Matthew Troutman
*Assistant Examiner* — James A Linford
(74) *Attorney, Agent, or Firm* — Wolf, Greenfield & Sacks, P.C.

(57) ABSTRACT

Disclosed are a branch tee for sprinkler pipes that automatically controls water stream, and a sprinkler piping system including the same. According to an aspect of the present disclosure, the branch tee for sprinkler pipes that automatically controls water stream may include: a branch tee body; an inlet formed on a side wall of the branch tee body and connected to a water supply pipe; a first outlet formed on a first end of the branch tee body and connected to a pipe of a closed-type sprinkler head; a second outlet formed on a second end of the branch tee body and connected to a pipe of an open-type sprinkler head; and a piston valve disposed in the branch tee body and configured to adjust a flow path cross-sectional area of a first flow path from the inlet to the first outlet and to open and close a second flow path from the inlet to the second outlet while moving between a first position and a second position spaced apart from each other
(Continued)

in a longitudinal direction of the branch tee body, the piston valve comprising a main valve body, a sub-valve body spaced apart from the main valve body in the longitudinal direction of the branch tee and formed with a smaller diameter than the main valve body, and a connecting member connecting the main valve body and the sub-valve body, wherein a first space portion, a second space portion, a third space portion and a fourth space portion partitioned by the branch tee body are successively formed from the first end to the second end within the branch tee body, the first space portion being connected to the first outlet and having a greater diameter than the second space portion, the second space portion having a greater diameter than the third space portion, the third space portion being connected to the inlet and having a greater diameter than the fourth space portion, the fourth space portion being connected to the second outlet and having a smaller diameter than the sub-valve body, wherein, when the piston valve is at the first position, the main valve body is disposed in the first space portion, and the second flow path is opened through the inlet, the third space portion, the fourth space portion and the second outlet, and when the piston valve is at the second position, the main valve body is disposed in the second space portion, and the second flow path is closed by the sub-valve body.

9 Claims, 15 Drawing Sheets

(56) References Cited

U.S. PATENT DOCUMENTS

| | | | | |
|---|---|---|---|---|
| 2003/0000585 A1* | 1/2003 | Cooper | ................ | F16K 11/048 |
| | | | | 137/625.5 |
| 2018/0243596 A1* | 8/2018 | Kim | ....................... | A62C 35/58 |
| 2020/0246650 A1 | 8/2020 | Meyer et al. | | |

FOREIGN PATENT DOCUMENTS

| | | | | |
|---|---|---|---|---|
| CN | 205626813 | U | | 10/2016 |
| CN | 111043328 | A | | 4/2020 |
| DE | 2547582 | A1 | * | 4/1977 |
| JP | H04505952 | A | | 10/1992 |
| JP | H0650667 | U | | 7/1994 |
| JP | 2008-067895 | A | | 3/2008 |
| JP | 2009-254907 | A | | 11/2009 |
| JP | 4495832 | B2 | | 7/2010 |
| JP | 2018-534088 | A | | 11/2018 |
| KR | 10-2017-0026154 | A | | 3/2017 |
| KR | 10-2017-0035837 | A | | 3/2017 |

OTHER PUBLICATIONS

Extended European Search Report for Application No. 22867678.9, mailed Dec. 5, 2024.
International Preliminary Report on Patentability for Application No. PCT/KR2022/013391, mailed Mar. 21, 2024.

* cited by examiner

10

10

10

100

200

200

10

103

103

BRANCH TEE FOR SPRINKLER PIPES CONTROLLING WATER STREAM AUTOMATICALLY AND SPRINKLER PIPING SYSTEM HAVING THE SAME

CROSS-REFERENCE TO RELATED APPLICATIONS

This Application is a National Stage filing under 35 U.S.C. § 371 of International PCT Application No. PCT/KR2022/013391, filed Sep. 6, 2022, which claims priority to Korean Application No. 10-2021-0119467, filed Sep. 8, 2021, and Korean Application No. 10-2022-0069018, filed Jun. 7, 2022. The entire contents of these applications are incorporated herein by reference in their entirety.

TECHNICAL FIELD

The present disclosure relates to a branch tee for sprinkler pipes that automatically controls water stream, and a sprinkler piping system including the same.

BACKGROUND ART

A sprinkler is an automatic fire extinguishing device for fire suppression that operates on the principle in which pressurized fire extinguishing water is sprinkled through sprinkler heads when a fire breaks out. The sprinkler heads may be classified into closed-type sprinkler heads or open-type sprinkler heads, depending on whether the heads are open or closed during normal conditions. While the closed-type sprinkler heads, which remain closed in the normal conditions, start sprinkling water when the head is opened by fire heat, the open-type sprinkler heads, which remain open in the normal conditions, start sprinkling water when a valve thereof is opened manually or by a sensor.

Fire extinguishing systems utilizing the open-type sprinkler heads have a plurality of sprinkler heads installed in close proximity to each other to facilitate high-density sprinkling and thus have the advantage of quickly suppressing the fires, but there is a risk of serious flooding damage if the sensor malfunctions.

On the contrary, fire extinguishing systems utilizing the closed-type sprinkler heads are in greater demand because there is no risk of sensor malfunction, owing to the opening of the head by fire heat.

Moreover, the closed-type sprinkler heads have the advantage of being able to selectively spray the fire area only.

Meanwhile, regulations stipulate that the closed-type sprinkler heads be installed within 30 cm from the ceiling to ensure that they can be opened by a ceiling jet flow formed by the rising hot gases generated by the fire.

Moreover, the skipping effect must also be considered when installing the closed-type sprinkler heads. The skipping effect refers to a phenomenon where water sprayed from the previously opened sprinkler head during a fire either directly wets surrounding sprinkler heads or is carried upward in droplet form along with the plume flow generated by the fire, thereby cooling the surrounding heads and interfering with opening of the surrounding heads. Moreover, the fire-extinguishing water sprayed from the sprinkler head opened earlier may cool the jet flow around the sprinkler head to interfere with the opening of the surrounding sprinkler heads. This skipping effect mainly occurs when closed-type sprinkler heads are installed too closely to one another. To prevent this, the National Fire Protection Association (NFPA) recommends installing general heads with a minimum spacing of at least 1.8 m and Early Suppression Fast Response (ESFR) heads with a minimum spacing of at least 2.4 m.

Accordingly, closed-type sprinkler heads have the problem of not being able to sufficiently increase the density of water discharge, even in places with a large amount of combustible materials, due to the inability to install the sprinkler heads densely.

Moreover, the skipping effect may also occur in places, such as parking lots, with numerous obstacles to water discharge, such as, for example, piping and cable trays.

In such places, to ensure that water is evenly discharged during a fire, sprinkler heads are installed, respectively, above and below the obstacles. The upper heads are opened first by the ceiling jet flow, but although the lower heads are expected to open as the fire progresses, the fire-extinguishing water sprayed from the earlier-opened upper heads may cause the skipping effect on the lower heads.

To prevent this, a baffle plate may be installed like an umbrella on the lower heads. However, while the baffle plate can prevent the fire-extinguishing water sprayed by the earlier-opened upper heads from directly wetting the lower heads, it is not possible to keep the fire-extinguishing water sprayed by the earlier-opened upper heads from cooling the ceiling jet flow around the lower heads, and as a result the skipping effect may occur.

Another example of a place where many water discharge obstacles are present is a rack-type warehouse. In the rack-type warehouse, it is difficult to discharge water evenly because goods are stacked on shelves in layers at high levels. To overcome this challenge, in-rack sprinkler heads equipped with baffle plates are installed, or ESFR heads that spray larger water droplets, which are less prone to being flown by plume flows, are installed in warehouses with ceiling heights of 13.7 m or less. Nevertheless, these measures still cannot prevent the skipping effect completely, and installing the sprinkler heads on the ceiling only results a significantly reduced fire extinguishing efficiency due to numerous watering obstacles.

DISCLOSURE

Technical Problem

Embodiments of the present disclosure provide a branch tee for sprinkler pipes that automatically controls water stream, and a sprinkler piping system including the same, which is capable of selectively watering a fire area only and preventing the skipping effect despite a narrow spacing between sprinkler heads.

Technical Solution

An aspect of the present disclosure may provide a branch tee for sprinkler pipes that automatically controls water stream, the branch tee including: a branch tee body; an inlet formed on a side wall of the branch tee body and connected to a water supply pipe; a first outlet formed on a first end of the branch tee body and connected to a pipe of a closed-type sprinkler head; a second outlet formed on a second end of the branch tee body and connected to a pipe of an open-type sprinkler head; and a piston valve disposed in the branch tee body and configured to adjust a flow path cross-sectional area of a first flow path from the inlet to the first outlet and to open and close a second flow path from the inlet to the second outlet while moving between a first position and a second position spaced apart from each other in a longitudinal direction of the branch tee body, the piston valve comprising a main valve body, a sub-valve body spaced apart from the main valve body in the longitudinal direction of the branch tee and formed with a smaller diameter than the main valve body, and a connecting member connecting the main valve body and the sub-valve body, wherein a first space portion, a second space portion, a third space portion and a fourth space portion partitioned by the branch tee body are successively formed from the first end to the second end within the branch tee body, the first space portion being connected to the first outlet and having a greater diameter than the second space portion, the second space portion having a greater diameter than the third space portion, the third space portion being connected to the inlet and having a greater diameter than the fourth space portion, the fourth space portion being connected to the second outlet and having a smaller diameter than the sub-valve body, wherein, when the piston valve is at the first position, the main valve body is disposed in the first space portion, and the second flow path is opened through the inlet, the third space portion, the fourth space portion and the second outlet, and when the piston valve is at the second position, the main valve body is disposed in the second space portion, and the second flow path is closed by the sub-valve body.

The branch tee body may be formed with a ring-shaped seating projection partitioning the fourth space portion, and when the piston valve is in the second position, the sub-valve body may be seated on the seating projection in the third space portion.

The branch tee may further include a sealing member interposed between the sub-valve body and the seating projection.

The sub-valve body may be provided with a seating surface formed with a greater diameter than the fourth space portion to be seated on the seating projection, a sloped surface extending obliquely from an edge of the seating surface towards the connecting member, and a plurality of recesses formed along the edge of the seating surface.

When the piston valve is in the first position, the sub-valve body may be spaced apart from the seating projection in the third space portion.

The first flow path may be formed through the inlet, the third space portion, the second space portion, the first space portion and the first outlet, but in an area where the main valve body is disposed, the first flow path may be formed through a gap between the main valve body and an inner surface of the branch tee body.

The branch tee may further include a spring interposed between the first end of the branch tee body and the main valve body.

A support pillar may be protruded toward the main valve body at the first end of the branch tee body, and the piston valve may be provided with a coupling portion for slidably coupling with the support pillar.

The coupling portion may be in the shape of a hole in which the support pillar is slidably coupled.

The coupling portion may be in the shape of a pillar that is slidably coupled to a hole formed in the support pillar.

An aspect of the present disclosure may provide a sprinkler piping system, including: a branch tee according to the first aspect; a closed-type sprinkler head connected to the first outlet of the branch tee through a pipe; and an open-type sprinkler head connected to the second outlet of the branch tee through a pipe, wherein when the closed-type sprinkler head is opened, a change in fluid pressure within the branch tee causes the piston valve to move from the second position to the first position, thereby opening the second flow path while increasing the flow path cross-sectional area of the first flow path.

Advantageous Effects

According to the present disclosure, the following advantageous effect may be recognized by utilizing a branch tee for sprinkler pipes and a sprinkler piping system including the same.

Firstly, since the present disclosure uses closed-type sprinkler heads as main heads, water may be discharged in the fire area only, thereby minimizing a flood damage in areas unaffected by the fire.

Secondly, since the present disclosure is structured to use an open-type sprinkler head as a sub-head in addition to the main head, with the main head and the sub-head connected through a branch tee capable of controlling the flow of water to allow the sub-head to automatically open when the main head is opened, it is possible to effectively suppress a fire, without a skipping effect, even in a place with numerous combustible materials or watering obstacles.

For example, in a place like a parking lot where there are many watering obstacles, the main heads may be arranged at regular intervals, and the sub-heads, which are linked with the main heads, may be arranged in between the main heads, thereby resulting in a dense arrangement of sprinkler heads to increase the watering density.

In another example, in a rack-type warehouse, the main heads may be arranged near the ceiling, and the sub-heads, which are linked with the main heads, may be arranged in between the shelves to overcome the watering impairment.

Thirdly, the present disclosure may allow a building to be designed with a floor height as low as possible within the limits not violating laws and regulations, thereby saving overall construction costs. Specifically, the parking lot laws require that the minimum height from the floor to the ceiling facilities (typically, sprinkler pipes or sprinkler heads) of an underground parking lot of a building be 2.3 m or more for passage areas and 2.1 m or more for parking lines. Since the present disclosure does not require separate drain valves or baffle plates because the sub-heads are arranged below the main heads but linked with the main heads, not only is it possible to lower the floor height of the building, but the building aesthetics may be also improved.

BEST MODE

Hereinafter, certain preferred embodiments of the present disclosure will be described in detail with reference to the accompanying drawings.

Unless otherwise defined, the terms used in the embodiments of the present disclosure may be interpreted to mean the general understanding of a person ordinarily skilled in the art to which the present disclosure pertains, may be deemed to merely describe certain embodiments, and are not intended to limit the present disclosure.

In the present specification, any singular expressions shall be deemed to include plural forms, unless otherwise described. When a component is described to "include" or "comprise" an element, it shall mean that the component may further include another element. Moreover, when it is described to be "on" an element, it shall be appreciated to be above or below said element, and not necessarily above said element in a gravitational direction.

When an element is described to be "connected" or "coupled" to another element, it shall include not only the case of said element directly being connected or coupled to the other element but also the case of said element indirectly being connected or coupled to the other element by way of yet another element. While terms such as "first" and "second" may be used to describe an element, these terms are used solely for the purpose of distinguishing one element from another element and are not intended to define, for example, the nature, order, or sequence of the elements.

Meanwhile, the branch tee may refer to a joint tube for connecting at least 3 pipes.

Figure 1:
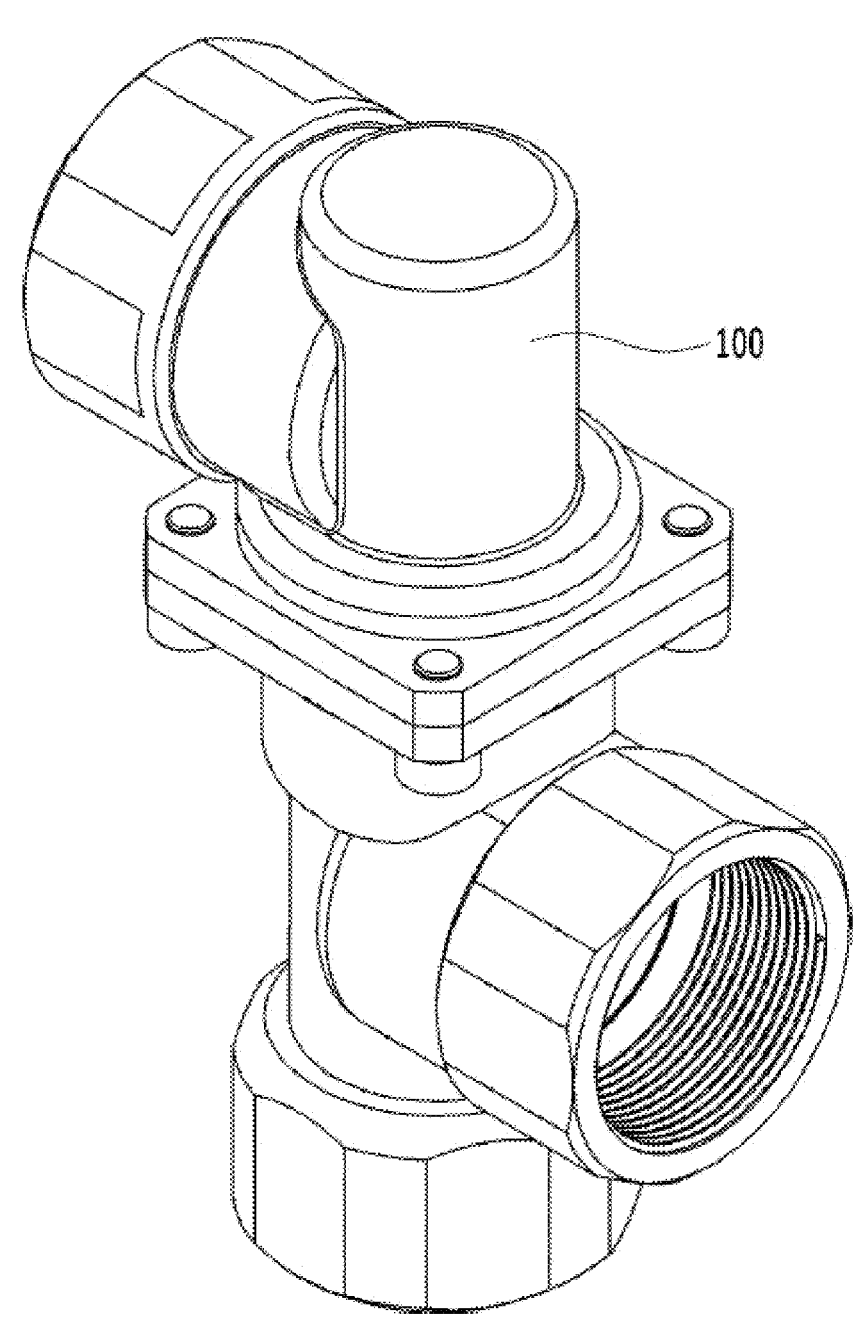
FIG. 1 is a perspective view of a branch tee for sprinkler pipes in accordance with an embodiment of the present disclosure.
Figure 2:
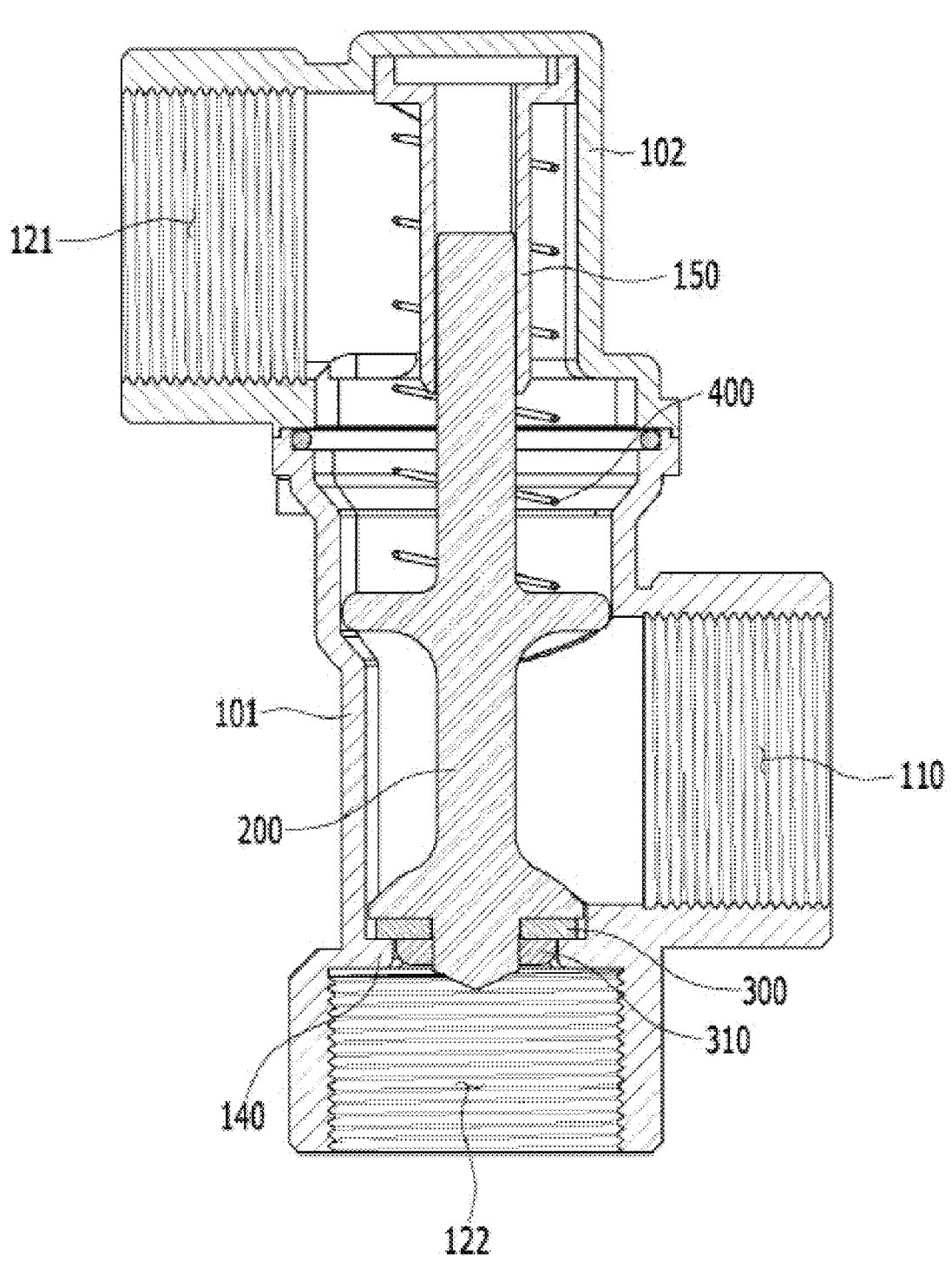
FIG. 2 is a cross-sectional view of the branch tee shown in FIG. 1.
Figure 3:
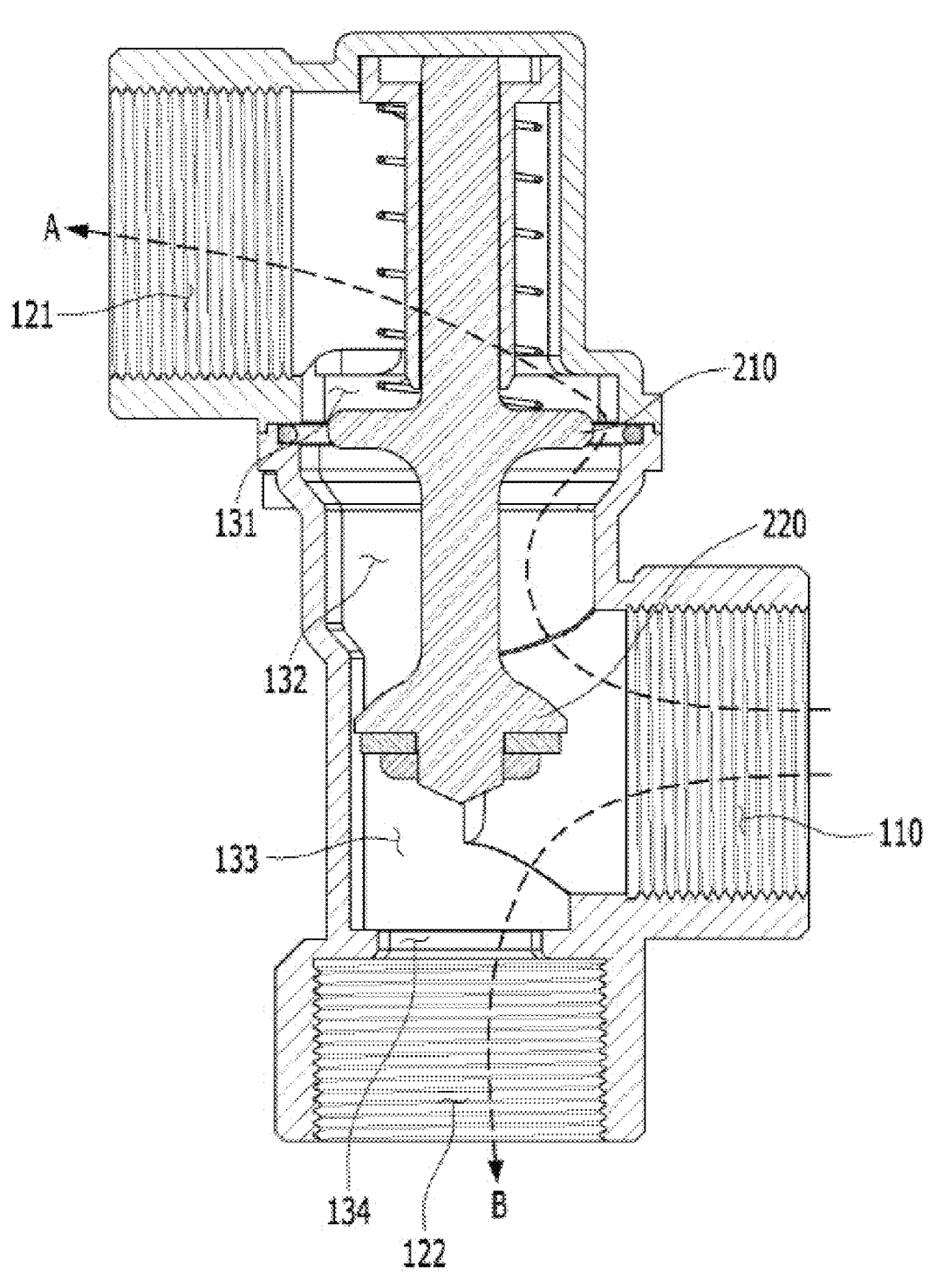
FIG. 3 illustrates an example of how the branch tee shown in FIG. 2 operates.
Figure 4:
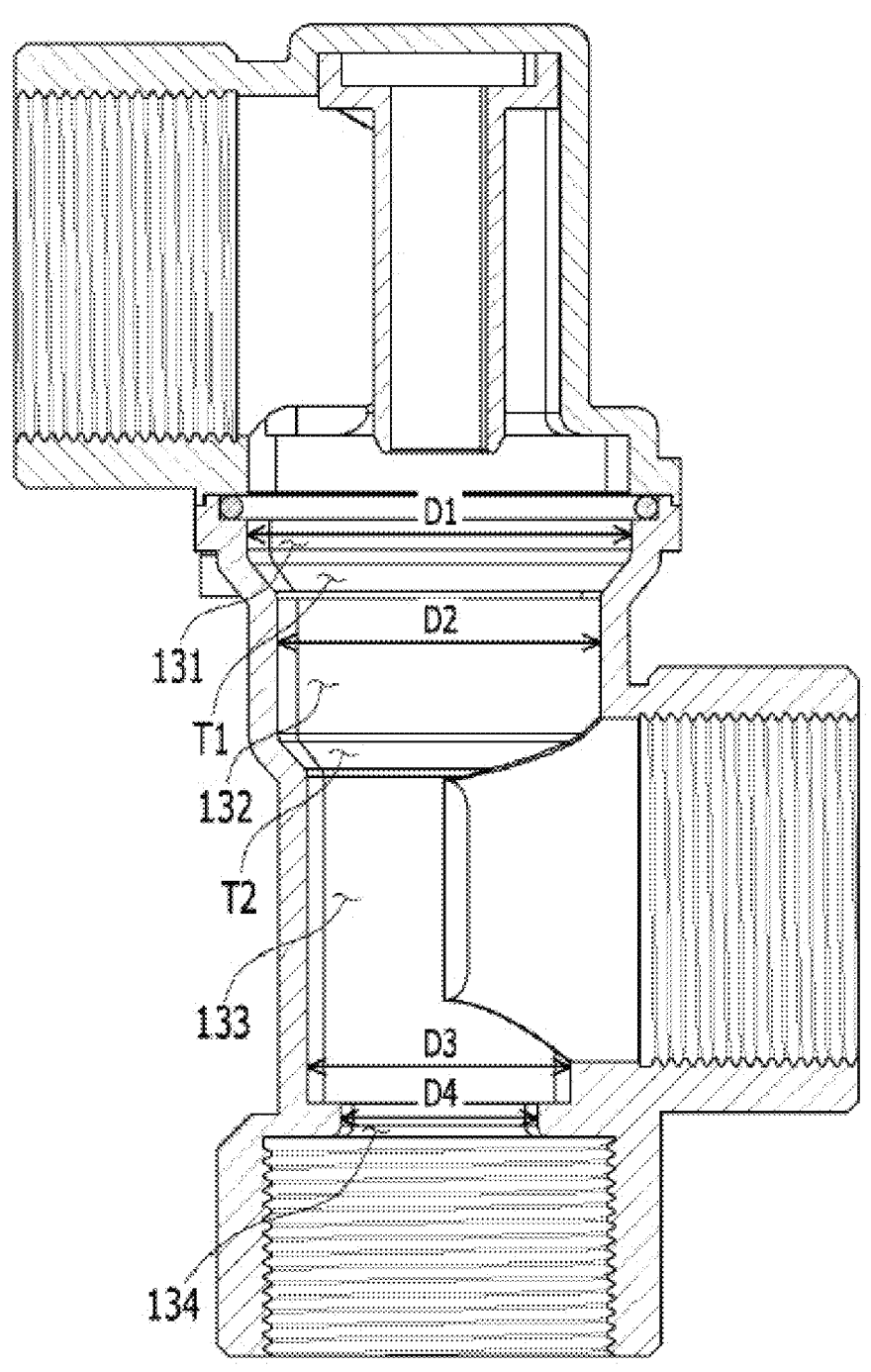
FIG. 4 shows a branch tee body of the branch tee shown in FIG. 2.
Figure 5:
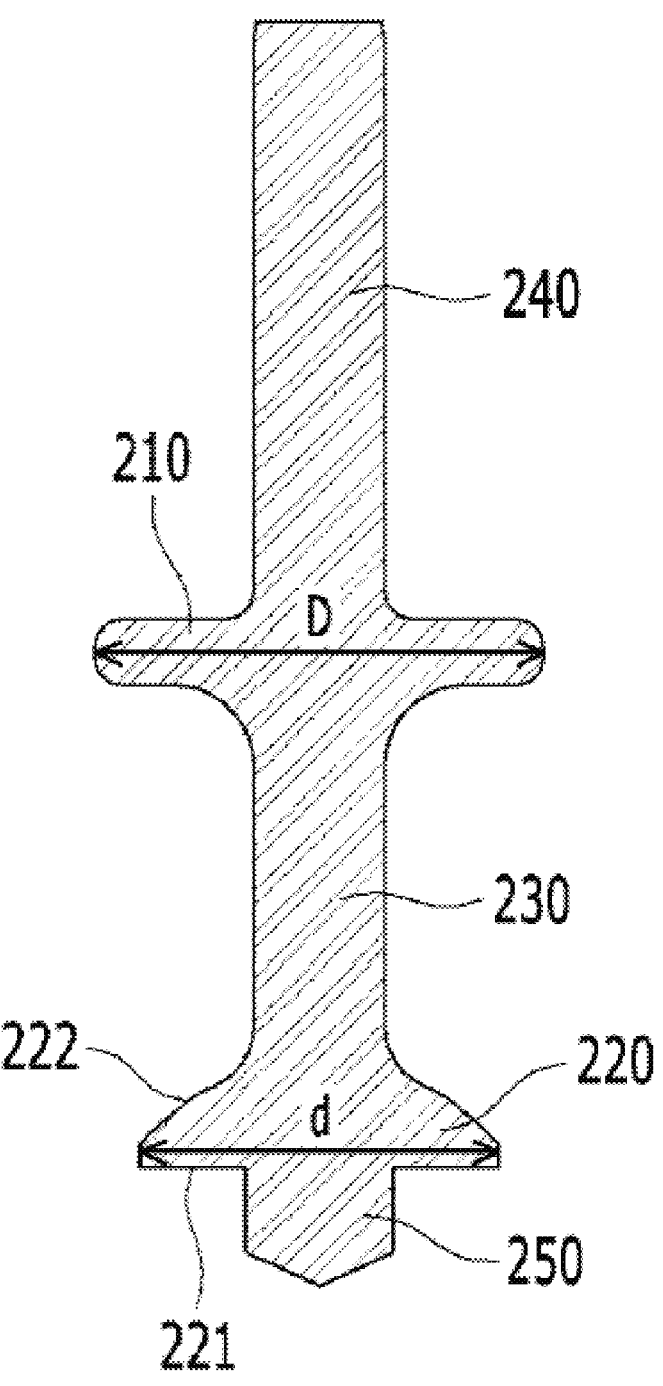
FIG. 5 is a piston valve of the branch tee shown in FIG. 2.
Figure 6:
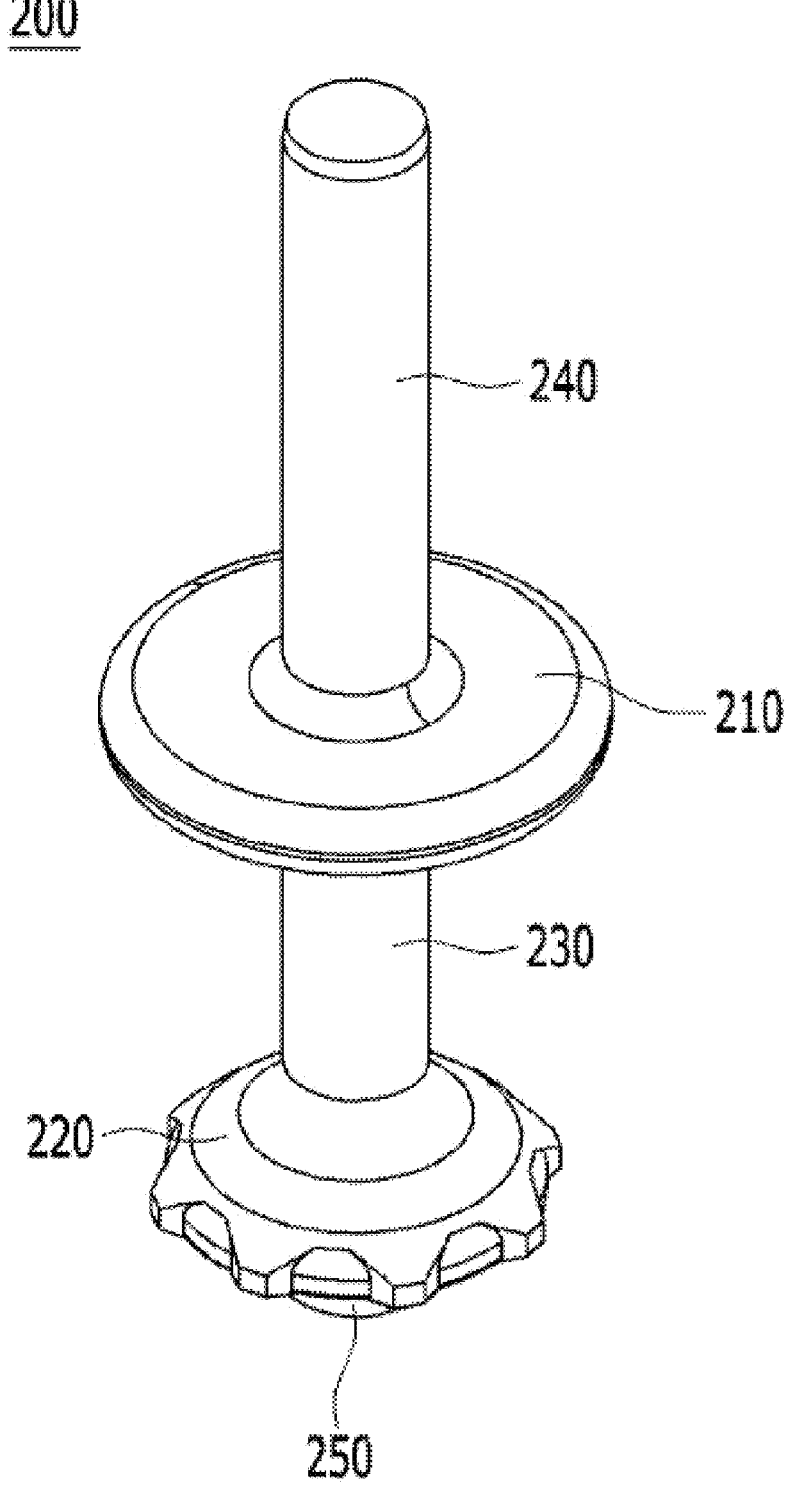
FIG. 6 is a perspective view of the piston valve shown in FIG. 5.
Figure 7:
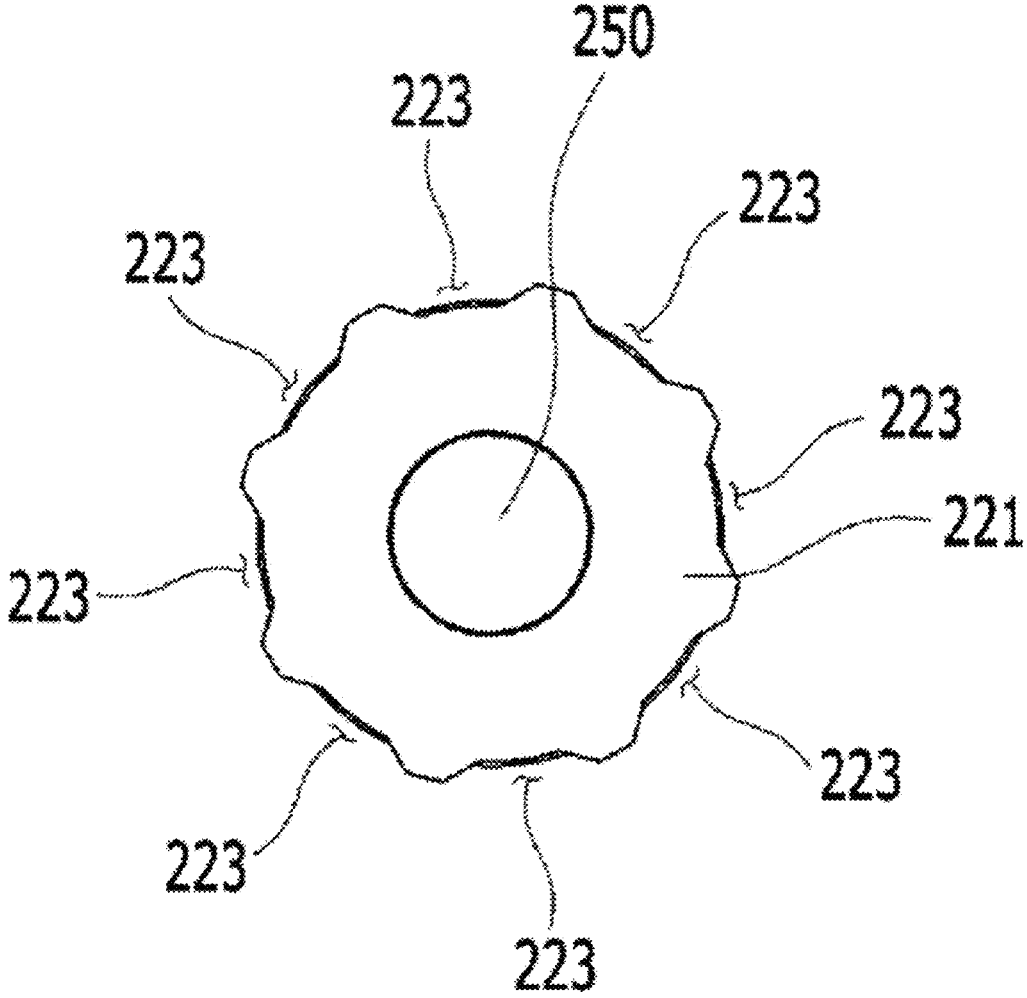
FIG. 7 shows the seating surface side of the sub-valve body shown in FIG. 5.

FIG. 1 is a perspective view of a branch tee for sprinkler pipes in accordance with an embodiment of the present disclosure; FIG. 2 is a cross-sectional view of the branch tee shown in FIG. 1; FIG. 3 illustrates an example of how the branch tee shown in FIG. 2 operates; FIG. 4 shows a branch tee body of the branch tee shown in FIG. 2; FIG. 5 is a piston valve of the branch tee shown in FIG. 2; FIG. 6 is a perspective view of the piston valve shown in FIG. 5; and FIG. 7 shows the seating surface side of the sub-valve body shown in FIG. 5.

Referring to FIGS. 1 to 7, the branch tee 10 for sprinkler pipes in accordance with an embodiment of the present disclosure may include a branch tee body 100 and a piston valve 200 and may further include a sealing member 300 and/or a spring 400.

The branch tee body 100 may have an overall shape of a cylinder or a tube and may be provided with an inlet 110, a first outlet 121 and a second outlet 122.

The inlet 110 may be formed on a side wall of the branch tee body 100 and may have a water supply pipe connected thereto. The water supply pipe may be connected to a fire pump or a municipal water supply pipe.

Therefore, the fire extinguishing water supplied through the water supply pipe may be flowed into the branch tee body 100 through the inlet 110.

The first outlet 121 may be formed at a first end in the longitudinal direction of the branch tee body 100, and the second outlet 122 may be formed at a second end of the branch tee body 100, the second end being an opposite side of the first end of the branch tee body 100.

That is, the inlet 110 may be formed between the first outlet 121 and the second outlet 122 in the longitudinal direction of the branch tee body 100.

The first outlet 121 may be connected to a closed-type sprinkler head via a first pipe.

Here, the closed-type sprinkler head may refer to any known type of sprinkler head that is structured to stay closed in a normal state but to be opened by heat from a fire.

The second outlet 122 may be connected to an open-type sprinkler head via a second pipe.

Here, the open-type sprinkler head may refer to any known type of sprinkler head that stays open in the normal state as well.

Therefore, when a second flow path B is opened, as will be described later, the fire extinguishing water flowed into the branch tee body 100 through the inlet 110 may be supplied to the closed-type sprinkler head and the open-type sprinkler head, respectively, through the first outlet 121 of a first flow path A and the second outlet 122 of the second flow path B.

Moreover, the branch tee body 100 may have a first space portion 131, a second space portion 132, a third space portion 133 and a fourth space portion 134 formed therein.

The first space portion 131, the second space portion 132, the third space portion 133 and the fourth space portion 134 may each refer to a space partitioned by the branch tee body 100 and may be successively arranged from the first end side towards the second end side of the branch tee body 100 along the lengthwise direction of the branch tee body 100.

Accordingly, the first space portion 131 may be connected to the first outlet 121, and the fourth space portion 134 may be connected to the second outlet 122. That is, the second space portion 132, the third space portion 133 and the fourth space portion 134 may be connected to the first outlet 121 via the first space portion 131, and the first space portion 131, the second space portion 132 and the third space portion 133 may be connected to the second outlet 122 via the fourth space portion 134.

Meanwhile, the third space portion 133 may be connected to the inlet 110, and the first space portion 131, the second space portion 132 and the fourth space portion 134 may be connected to the inlet 110 via the third space portion 133.

The first space portion 131, the second space portion 132, the third space portion 133 and the fourth space portion 134 may be characterized by the diameters of their sections perpendicular to the lengthwise direction of the branch tee body 100, i.e., the cross-sectional surface.

Specifically, a first diameter D1 of the first space portion 131 may be greater than a second diameter D2 of the second space portion 132, the second diameter D2 of the second space portion 132 may be greater than a third diameter D3 of the third space portion 133, and the third diameter D3 of the third space portion 133 may be greater than a fourth diameter D4 of the fourth space portion 134.

Therefore, formed successively between the third space portion 133 connected to the inlet 110 and the first outlet 121 may be the second space portion 132, which is a space with an expanded diameter than the third space portion 133, and the first space portion 131, which is a space with an expanded diameter than the second space portion 132.

Moreover, the first space portion 131 and the second space portion 132 may be connected to each other via a first tapered region T1, in which the diameter thereof continuously decreases along the longitudinal direction of the branch tee body 100 from an end of the first space portion 131 to an end of the second space portion 132, and the second space portion 132 and the third space portion 133 may be connected to each other via a second tapered region T2, in which the diameter thereof continuously decreases along the longitudinal direction of the branch tee body 100 from an end of the second space portion 132 to an end of the third space portion 133.

Therefore, it is possible to minimize the increase in fluid resistance that may occur due to discontinuous diameter expansion.

Moreover, a seating projection 140 may protrude in a ring shape along a circumferential direction on an inner surface of the branch tee body 100, and the fourth space portion 134 may be partitioned by the seating projection 140.

The branch tee body 100 may include a main body 101 and a cap 102 detachably coupled to the main body 101 by bolts, rivets, etc. In such a case, while the inlet 110 and the second outlet 122 may be formed in the main body 101, the first outlet 121 may be formed in the cap 102.

The piston valve 200 may be disposed within the branch tee body 100 so as to be slidable in the longitudinal direction of the branch tee body 100.

The piston valve 200 may adjust a flow path cross-sectional area of the first flow path A from the inlet 110 to the first outlet 121 and open and close the second flow path B from the inlet 110 to the second outlet 122 while moving between a first position (see FIG. 3) and a second position (see FIG. 2) spaced apart from each other in the longitudinal direction of the branch tee body 100.

The piston valve 200 may include a main valve body 210, a sub-valve body 220 and a connecting member 230 and may further include a coupling portion 240.

The main valve body 210 may have the shape of a disc that is vertically disposed in the longitudinal direction of the branch tee body 100.

The sub-valve body 220 may be connected to the main valve body 210 via the connecting member 230 and may be spaced apart from the main valve body 210 in the longitudinal direction of the branch tee body 100.

The diameter d of the sub-valve body 220 may be greater than the fourth diameter D4 of the fourth space portion 134.

The piston valve 200 may be placed at the second position by the fluid pressure of the fire extinguishing water supplied into the branch tee body 100 when the closed-type sprinkler head connected to the first outlet 121 is closed.

As such, when the piston valve 200 is at the second position, the main valve body 210 may be disposed in the second space portion 132, and the sub-valve body 220 may be seated on the seating projection 140 in the third space portion 133.

Accordingly, the first flow path A may be formed through a gap between the main valve body 210 and the inner surface of the branch tee body 100 to have a very small flow path cross-sectional area, and the second flow path B may be closed by the sub-valve body 220.

For example, a diameter D of the main valve body 210 may be slightly smaller than the second diameter D2 of the second space portion 132.

In such a case, since the fire extinguishing water in the third space portion 133 may enter and exit the first space portion 131 through a small gap formed between the main valve body 210 and the inner surface of the branch tee body 100, the fluid pressure acting on both sides of the main valve body 210 may be equal and thus canceled out.

Moreover, when the piston valve 200 moves from the second position to the first position, there may be little friction resistance between the main valve body 210 and the branch tee body 100.

Moreover, for the same reason, the diameter d of the sub-valve body 220 may be slightly smaller than the third diameter D3 of the third space portion 133.

That is, while the diameter d of the sub-valve body 200 would need to be equal to the third diameter D3 of the third space portion 133 in order to have the sub-valve body 220 supported by the branch tee body 100 when the piston valve moves, the diameter d of the sub-valve body 200 may be formed to be slightly smaller than the third diameter D3 of the third space portion 133 in order to have little friction resistance between the sub-valve body 220 and the branch tee body 100. Nevertheless, the present disclosure is not limited to what is described above, and the diameter d of the sub-valve body 220 may be equal to the third diameter D3 of the third space portion 133.

Once the closed-type sprinkler head connected to the first outlet 121 is opened by the heat from a fire, the fluid pressure on the side of the first outlet 121 of the main valve body 210 is lowered to the level of atmospheric pressure, and the piston valve 200 may be moved to the first position by the fluid pressure of the fire extinguishing water supplied to the branch tee body 100.

As such, when the piston valve 200 is moved to the first position, the main valve body 210 may be disposed in the first space portion 131, and the sub-valve body 220 may be disposed in the third space portion 133 but spaced apart from the seating projection 140.

Therefore, although the first flow path A is formed through the inlet 110, the third space portion 133, the second space portion 132, the first space portion 131 and the first outlet 121, the flow path cross-sectional area formed through the gap between the main valve body 210 and the inner surface of the branch tee body 100 is increased, compared to the second position, in the region where the main valve body 210 is disposed. Accordingly, the fire extinguishing water may be readily discharged through the first flow path A, and the second flow path B may be opened through the inlet 110, the third space portion 133, the fourth space portion 134 and the second outlet 122.

Meanwhile, if the diameter D of the main valve body 210 were equal to or smaller than the diameter d of the sub-valve body 220, the force applied to the main valve body 210 by the fluid pressure of the fire extinguishing water suppled into the branch tee body 210 would be equal to or smaller than the force applied to the sub-valve body 220 even though the closed-type sprinkler head is opened, thereby keeping the piston valve 200 from moving to the first position and thus resulting in keeping the second flow path B from opening.

However, in the present disclosure, the above problems may be prevented by making the diameter D of the main valve body 210 greater than the diameter d of the sub-valve body 220.

Moreover, the sub-valve body 2200 may be provided with a seating surface 221, a sloped surface 221 and a plurality of recesses 223

The seating surface 221 may be formed with the diameter d, which is greater than the fourth diameter D4 of the fourth space portion 134 to be seated on the seating projection 140.

The sloped surface 222 may be obliquely extended from an outer edge of the seating surface 221 towards the connecting member 230.

For instance, due to the seating surface 221 and the sloped surface 222, the sub-valve body 220 may be formed in the shape of a truncated cone.

The recess 223 may depressed toward the center of the sub-valve body 220 at the outer edge of the seating surface 221 and a lower edge of the sloped surface 222, and the plurality of recesses 223 may be radially spaced apart from each other along the outer edge of the seating surface 221.

Therefore, if sediments in the fire extinguishing water were precipitated in the sub-valve body 2200 as the second flow path B is closed by the sub-valve body 220 for an extended period of time, the plurality of recesses 223 would be able to provide a precipitation space, and the sloped surface 222 would be able to guide the sediments to the recesses 223.

As a result, the sub-valve body 220 may not be permanently fixed to the branch tee body 100 due to the accumulation of the sediments.

However, the present disclosure is not limited to what is described above, and the sub-valve body 220 may not be provided with the sloped surface 222 although the seating surface 221 and the recesses 223 are provided.

The connecting member 230 may be formed with a smaller diameter than the diameters of the main valve body 210 and the sub-valve body 220 and may connect, for example, the center of the main valve body 210 and the center of the sub-valve body 220.

The coupling portion 240 may be slidably coupled to a support pillar 150 formed in the branch tee body 100.

Specifically, the support pillar 150 may be protruded towards the main valve body 210 at the first end of the branch tee body 100, and the coupling portion 240 may be formed in the shape of a pillar protruded in the main valve body 210 towards the first end of the branch tee body 100 in the longitudinal direction of the branch tee body 100 and may be slidably coupled with a hole formed in the support pillar 150.

Therefore, the movement of the piston valve 200 in the longitudinal direction of the branch tee body 100 may be better secured.

Meanwhile, the coupling portion 240 may be formed with a slightly smaller diameter than a diameter of the hole formed in the support pillar 150 to minimize the friction resistance between the coupling portion 240 and the support pillar 150.

The sealing member 300 may be interposed between the sub-valve body 220 and the seating projection 140 such that the second flow path B may be completely closed off when the sub-valve body 220 is seating on the seating projection 140.

The sealing member 300 may be made of, for example, rubber and formed in the shape of a ring.

The sealing member 300 may be coupled to the sub-valve body 220 to be disposed on the seating surface 221.

Specifically, a coupling projection 250 may be protruded from the seating surface 221 of the sub-valve body 200 towards the second end of the branch tee body 100, and the sealing member 300 may be coupled with the coupling projection 250 and may be fastened by having an anti-disengagement member 310, such as a nut, additionally coupled to the coupling projection 250.

The spring 400 may be interposed between the first end of the branch tee body 100 and the main valve body 210.

The spring 400 may provide an elastic force in the longitudinal direction of the branch tee body 100 such that the second flow path B is closed off in the normal state.

However, the present disclosure is not limited to what is described above, and the spring 400 may be omitted or excluded.

Figure 8:
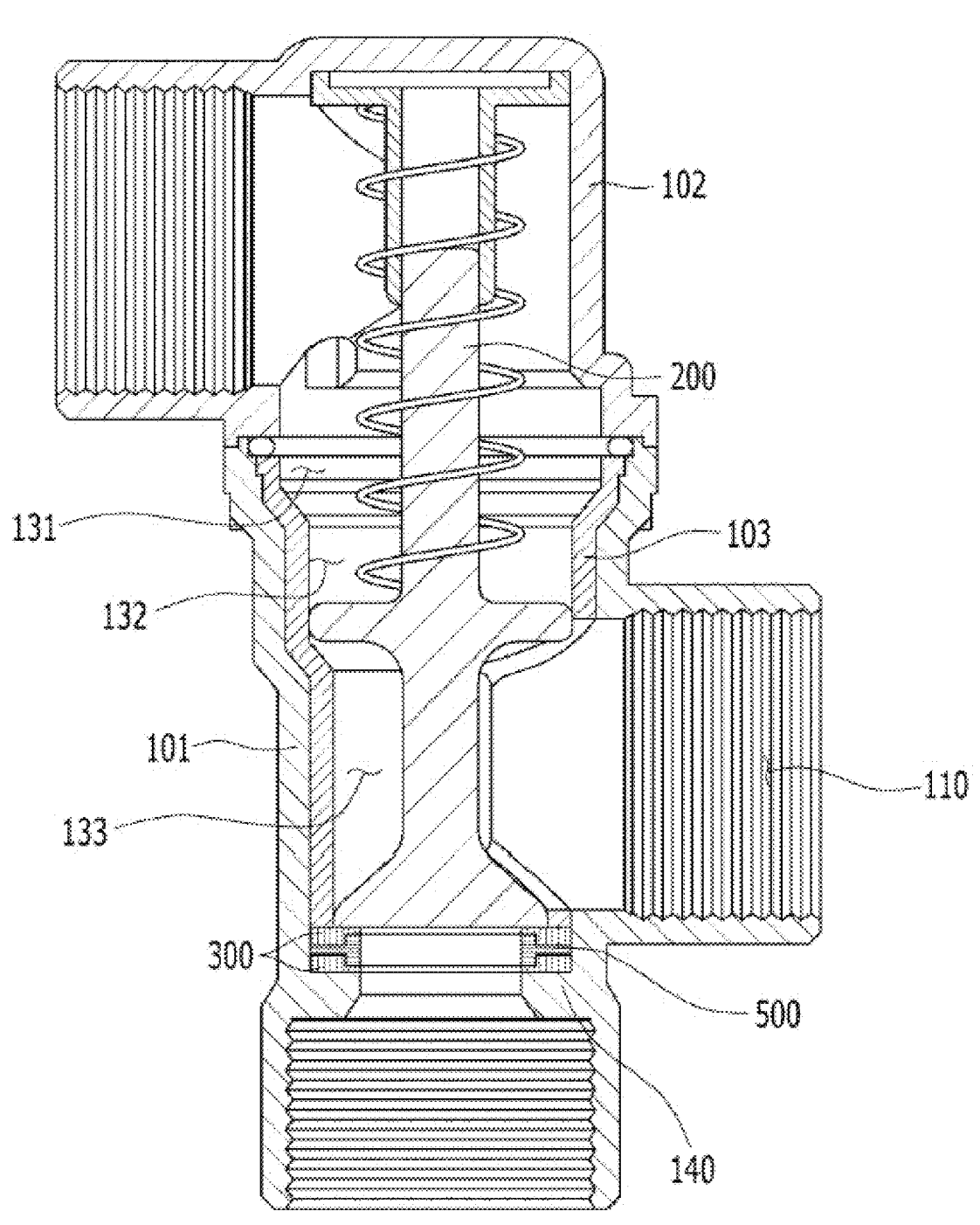
FIG. 8 and FIG. 9 illustrate examples of modification of the branch tee shown in FIG. 2 and FIG. 3, respectively.
Figure 9:
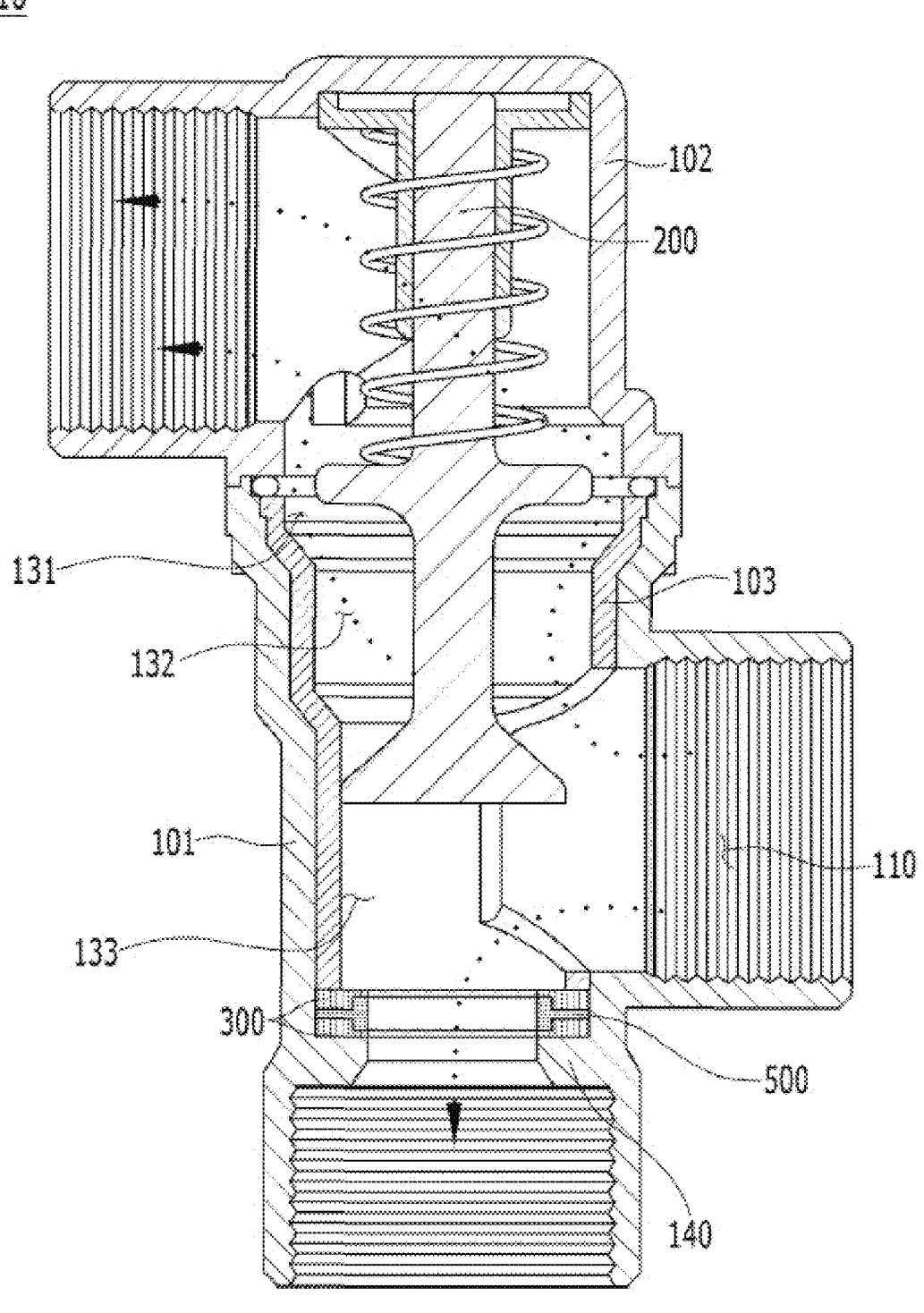
Figure 10:
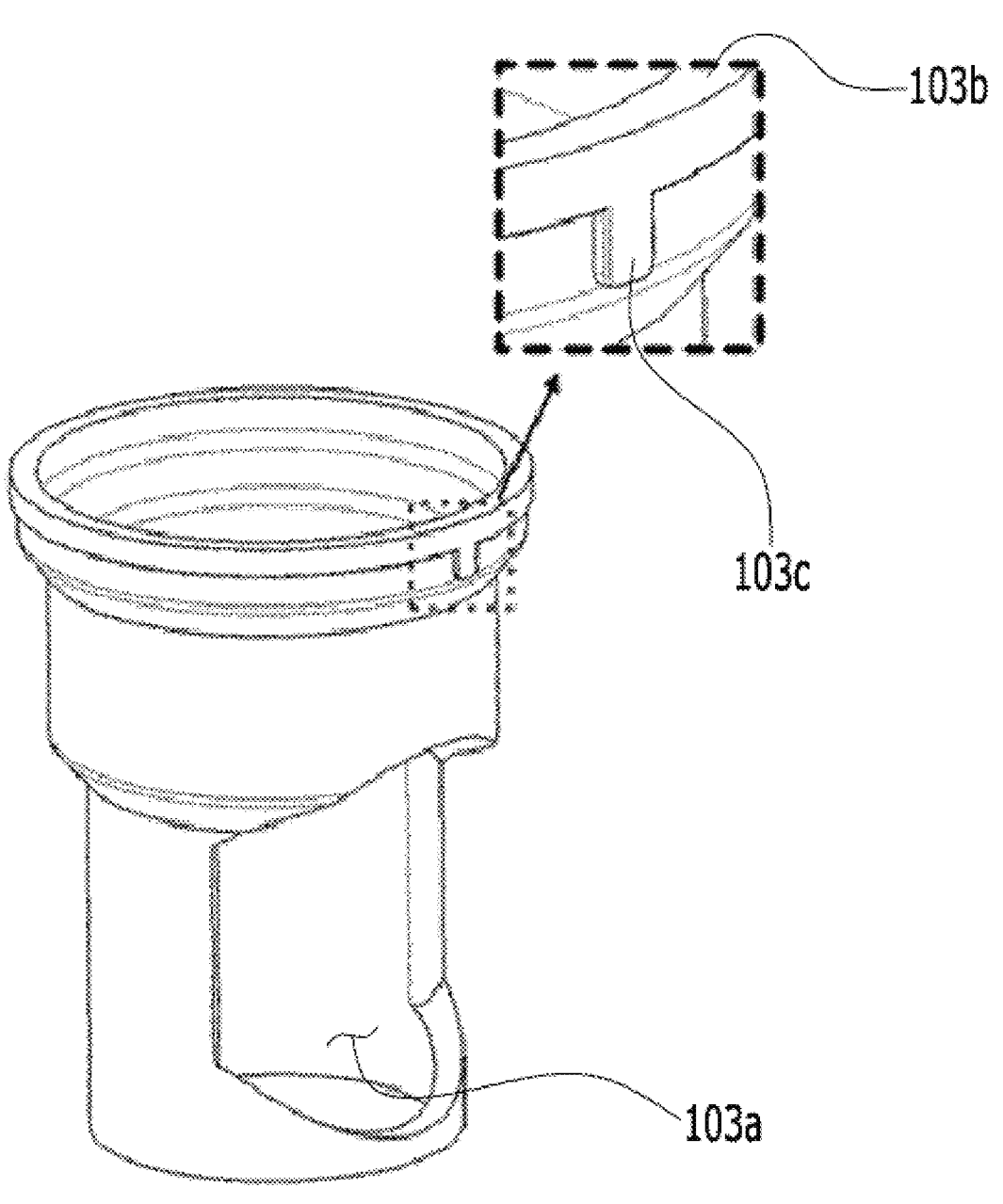
FIG. 10 is a perspective view of the sleeve of the branch tee shown in FIG. 8.

FIG. 8 and FIG. 9 illustrate examples of modification of the branch tee shown in FIG. 2 and FIG. 3, respectively, and FIG. 10 is a perspective view of the sleeve of the branch tee shown in FIG. 8.

Referring to FIGS. 8 to 10, the branch tee body 100 may further include a sleeve 103 in addition to the main body 101 and the cap 102.

The sleeve 103 may be fitted closely to the inner surface of the main body 101 to partition the first space portion 131, the second space portion 132 and the third space portion 133.

The sleeve 103 may be made of a material that does not easily rust, for example, plastic.

Therefore, even if the main body 101 is made of steel, it is possible to prevent a malfunction of the piston valve 200 caused by rust. For example, the main body 101 may be made of galvanized steel.

Meanwhile, the piston valve 200 may be also made of, but not limited to, plastic.

The sleeve 103 may be omitted, as shown in FIGS. 1 to 7, if the main body 101 and the cap 102 are made of a corrosion-resistant material, for example, brass.

Formed on a side wall of the sleeve 103 may be a sub-inlet 103a, which is connected to the inlet 110 of the main body 101.

Moreover, a ring-shaped stopper curb 103b is formed and extended in a circumferential direction on an outer surface of an end of the sleeve 103 to block an excessive compressive force of the seal interposed between the main body 101 and the cap 102 and prevent the sleeve 103 from deforming.

Moreover, a positioning part 103c may be formed in the shape of a projection or a groove on the outer surface of the end of the sleeve 103 to assist with alignment of the sub-inlet 103a and the inlet 110.

Moreover, a gasket 500 made of a corrosion-resistant material, for example, brass, may be interposed between the sub-valve body 220 and the seating projection, and the gasket 500 may have the sealing member 300 laminated on both sides thereof before being attached to the seating projection 140.

Figure 11:
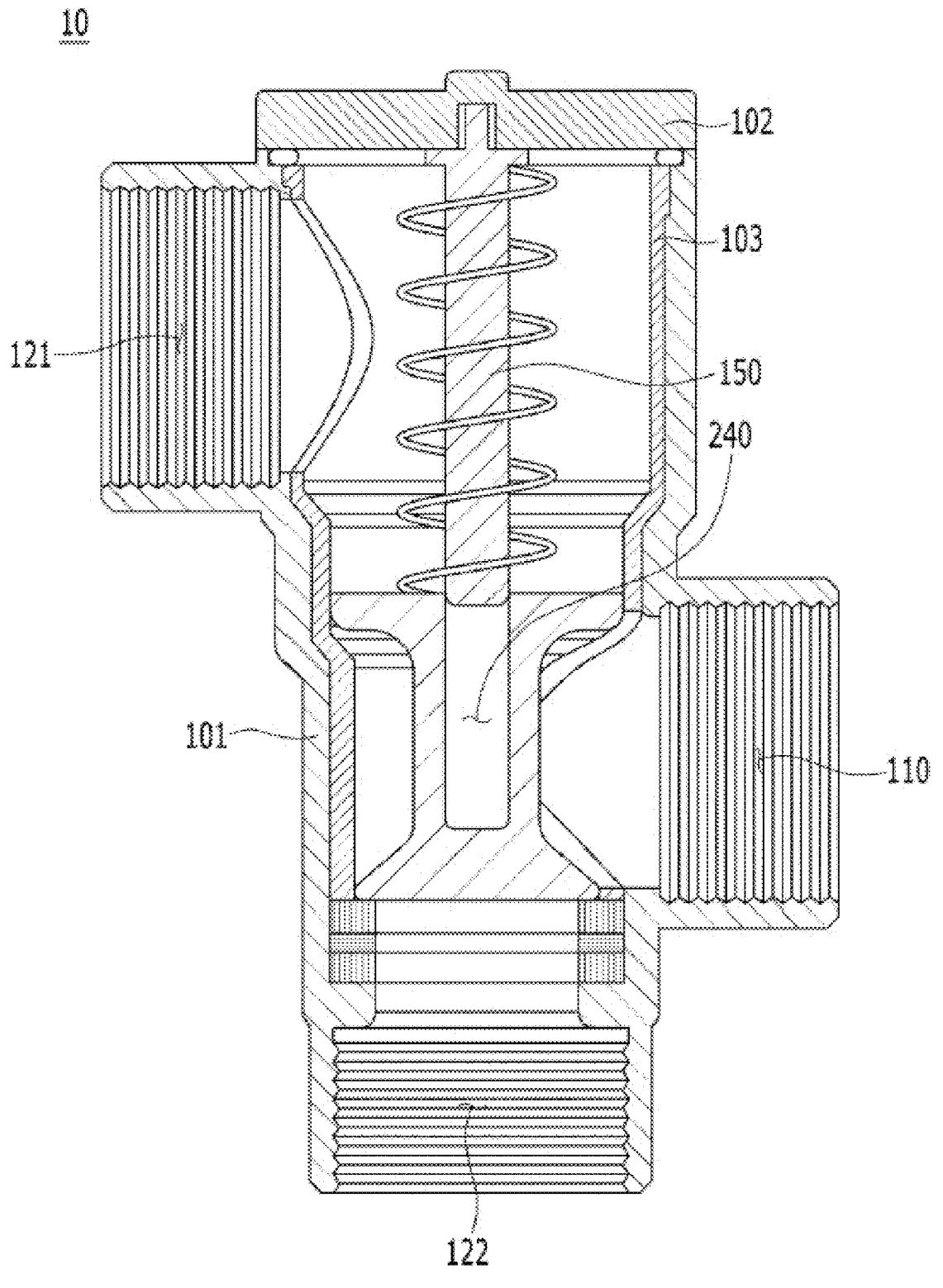
FIG. 11 shows another example of modification of the branch tee shown in FIG. 2.

FIG. 11 shows another example of modification of the branch tee shown in FIG. 2.

Referring to FIG. 11, the cap 102 may formed in the shape of a plate, in which case all of the inlet 110, the first outlet 121 and the second outlet 122 may be formed in the main body 101.

Moreover, the coupling portion 240 may be formed in the shape of a hole extended from one surface of the main valve body 210 to an inside of the connecting member 230 along the longitudinal direction of the branch tee body 100, and the support pillar 150 formed on the first end of the branch tee body 100 may be slidably coupled to the coupling portion 240.

Meanwhile, the coupling portion 240 may be formed in the shape of a hole having a slightly greater diameter than the diameter of the support pillar 150 to minimize the friction resistance between the coupling portion 240 and the support pillar 140.

Figure 12:
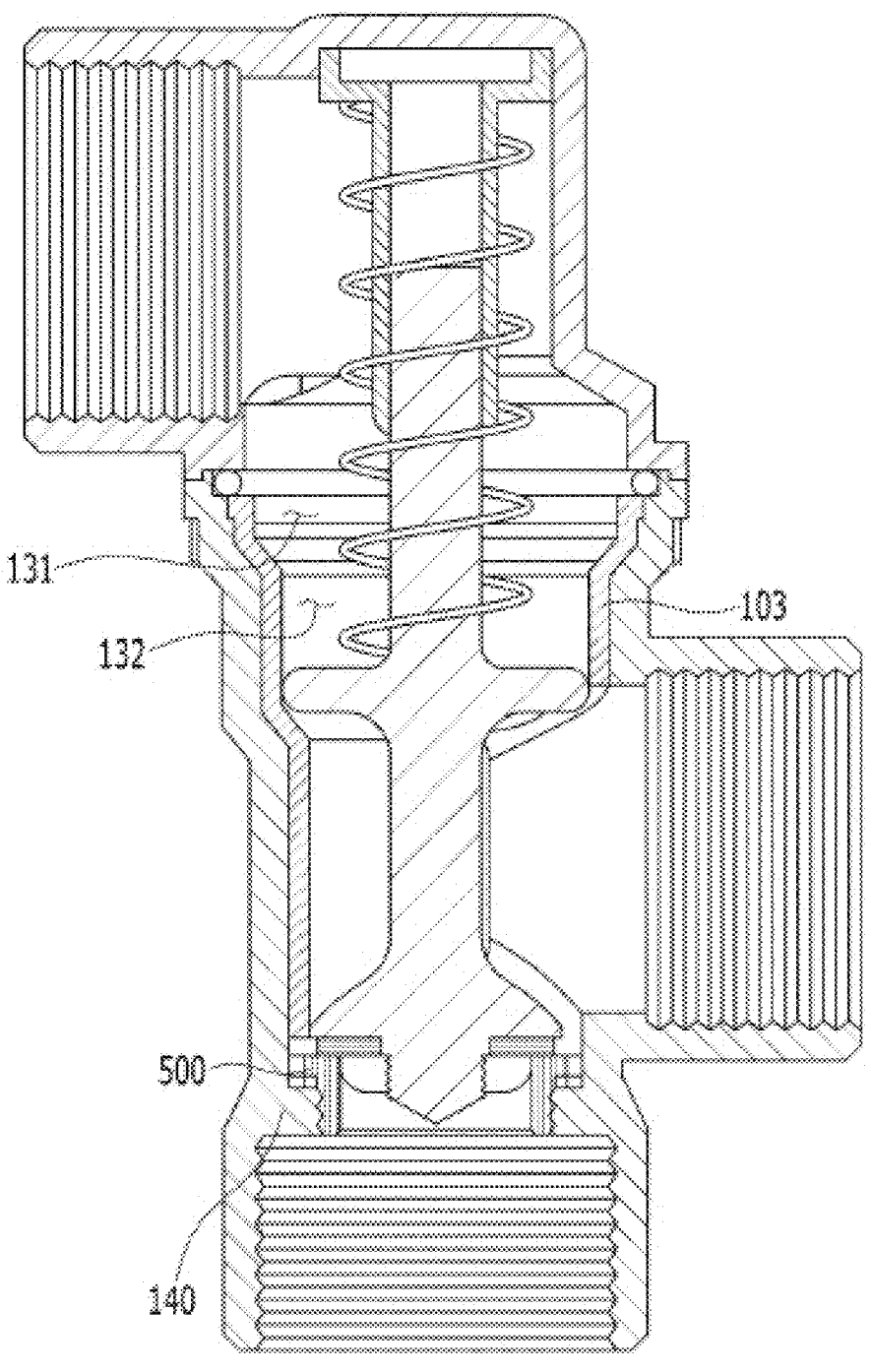
FIGS. 12 to 14 illustrate yet another examples of modification of the branch tee shown in FIG. 2.
Figure 13:
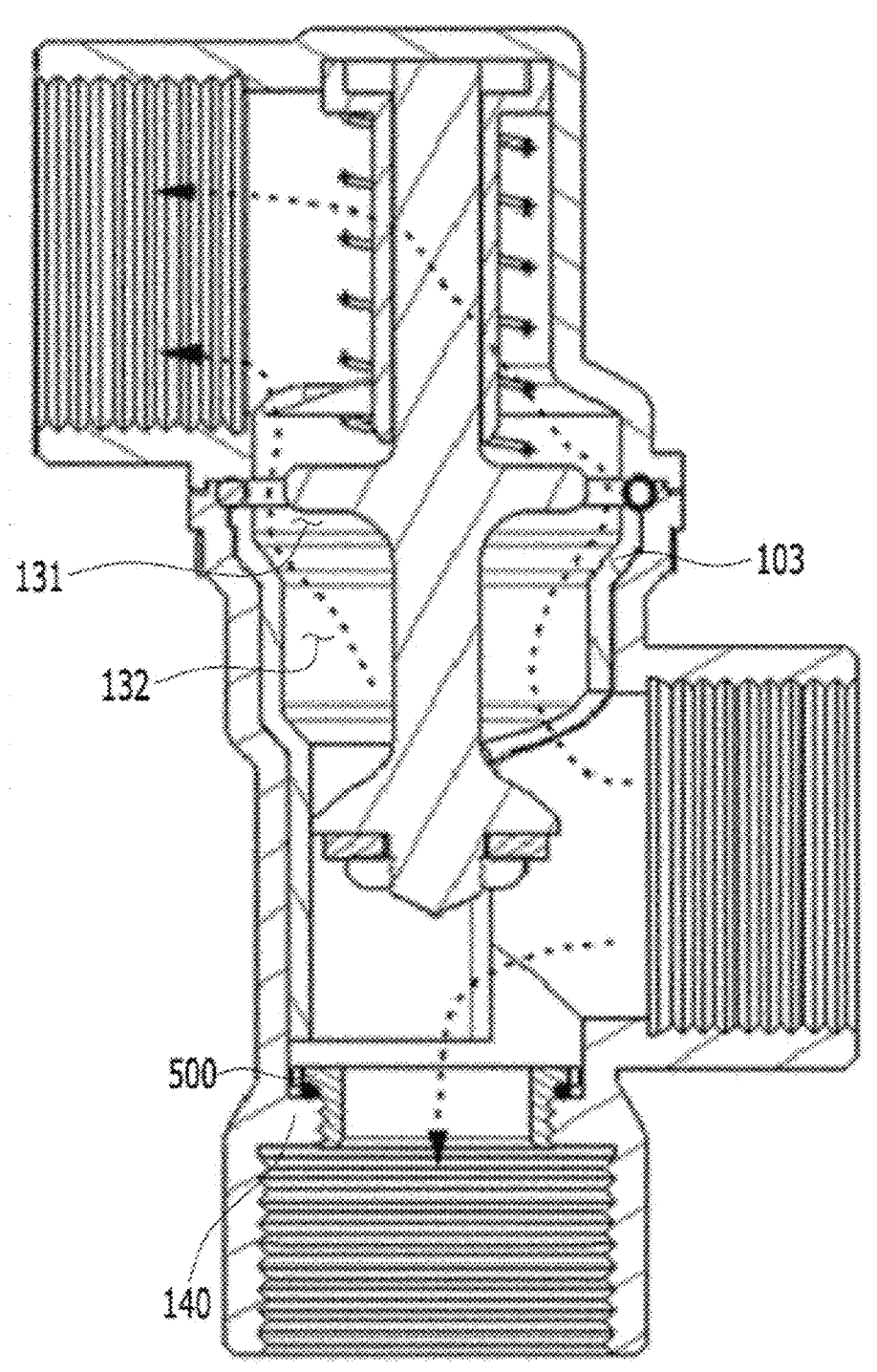
Figure 14:
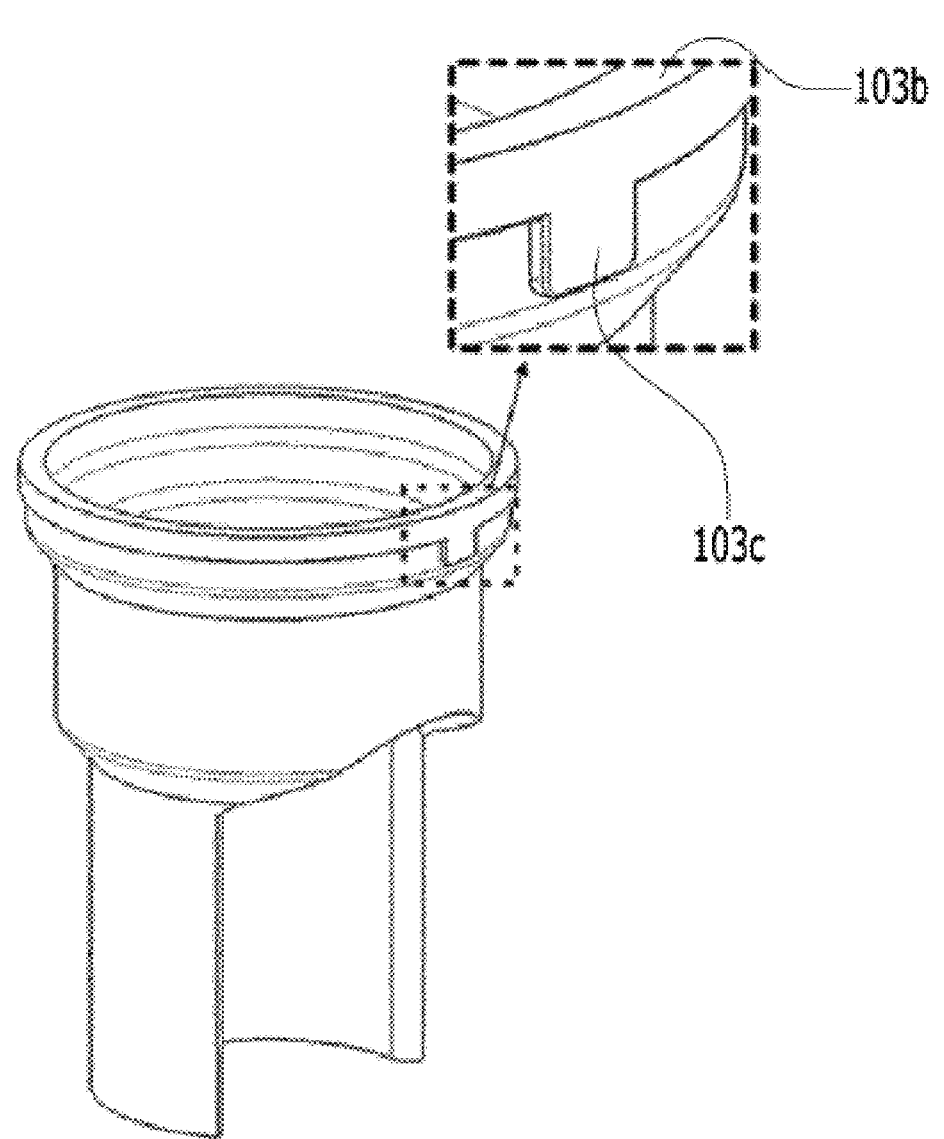

FIGS. 12 to 14 illustrate yet another examples of modification of the branch tee shown in FIG. 2.

Referring to FIGS. 12 to 14, the gasket 500 may be screw-coupled to the seating projection 140.

Meanwhile, it shall be appreciated that any of the technical features described or illustrated in one of the described embodiments or modifications may be applied identically or with a proper modification conceivable by an ordinarily skilled person in another embodiment or modification.

Figure 15:
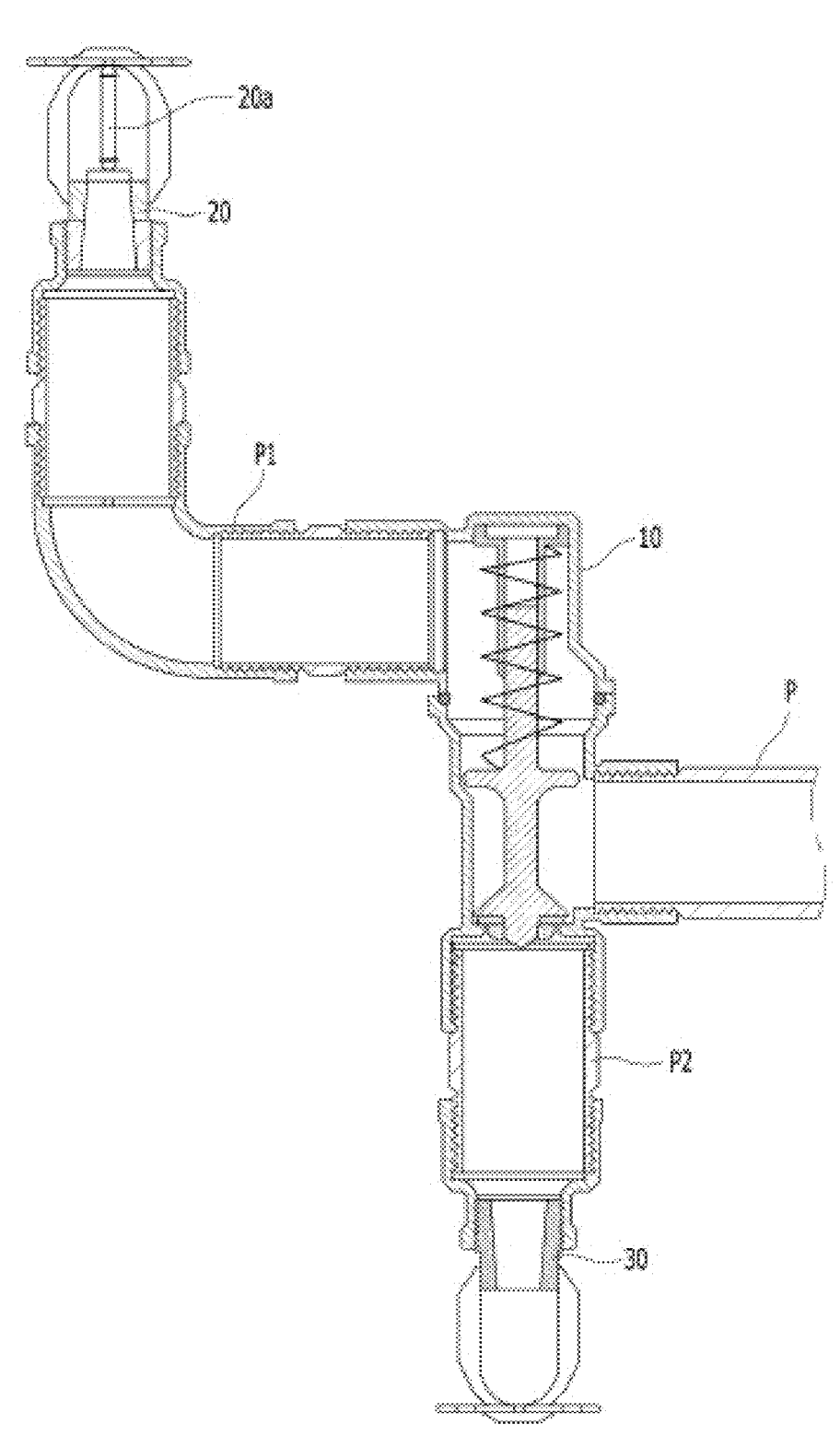
FIG. 15 shows a sprinkler piping system in accordance with another embodiment of the present disclosure.

FIG. 15 shows a sprinkler piping system in accordance with another embodiment of the present disclosure.

Referring to FIG. 15, the sprinkler piping system 1 in accordance with another embodiment of the present disclosure may include a branch tee 10, a closed-type sprinkler head 20 and an open-type sprinkler head 30.

The branch tee 10 is identical to what has been described with reference to FIGS. 1 to 14 and thus will not be redundantly described herein.

The closed-type sprinkler head 20 may be connected to a first outlet 121 of the branch tee 10 via a first pipe P1, and the open-type sprinkler head 30 may be connected to a second outlet 122 of the branch tee 10 via a second pipe P2.

Connected to an inlet 110 of the branch tee 10 may be a water supply pipe P.

The closed-type sprinkler head 20 may be provided with a heat sensing portion 20a, which may keep the head closed in the normal state and open the head by sensing the heat from a fire.

Therefore, when the closed-type sprinkler head 20 is opened by the heat from a fire, a piston valve 200 may move from a second position to a first position in accordance with a change in fluid pressure within the branch tee 10, thereby resulting in opening a second flow path B and increasing the flow path cross-sectional area of a first flow path A.

Hitherto, while certain preferred embodiments of the present disclosure have been described, the described embodiments are presented for illustrative purposes only and are not intended to limit the present disclosure thereto. Any one of ordinary skill in the art to which the present disclosure pertains shall appreciate that any variety of permutations and/or modifications of the described embodiments are possible, without departing from the technical ideas of the present disclosure described in the appended claims, by supplementing, modifying, deleting or adding certain elements, and that such permutations and/or modifications are included in the claims of the present disclosure.

What is claimed is:

1. A branch tee for sprinkler pipes for automatically controlling a water stream, the branch tee including:
   a branch tee body;
   an inlet formed on a side wall of the branch tee body and connected to a water supply pipe;
   a first outlet formed on a first end of the branch tee body and connected to a pipe of a closed-type sprinkler head;
   a second outlet formed on a second end of the branch tee body and connected to a pipe of an open-type sprinkler head; and
   a piston valve disposed in the branch tee body and configured to adjust a flow path cross-sectional area of a first flow path from the inlet to the first outlet and to open and close a second flow path from the inlet to the second outlet while moving between a first position and a second position spaced apart from each other in a longitudinal direction of the branch tee body,
   wherein the piston valve comprises a main valve body, a sub-valve body spaced apart from the main valve body in the longitudinal direction of the branch tee and formed with a smaller diameter than the main valve body, and a connecting member connecting the main valve body and the sub-valve body,
   wherein a first space portion, a second space portion, a third space portion and a fourth space portion partitioned by the branch tee body are successively formed from the first end to the second end within the branch tee body,
   wherein the first space portion is connected to the first outlet and having a greater diameter than the second space portion, the second space portion has a greater diameter than the main valve body, the third space portion is connected to the inlet and has a greater diameter than the fourth space portion, and the fourth space portion is connected to the second outlet and has a smaller diameter than the sub-valve body,
   wherein the branch tee body is formed with a ring-shaped seating projection partitioning the fourth space portion,
   wherein, when the piston valve is in the first position, the main valve body is disposed in the first space portion, and the second flow path is opened through the inlet, the third space portion, the fourth space portion and the second outlet, and
   wherein, when the piston valve is at the second position, the main valve body is disposed in the second space portion such that an entire lower surface of the main valve body is exposed to the water stream and the third space portion is connected to the first space portion through a gap between the main valve body and an inner surface of the branch tee body, wherein the sub-valve body is seated on a seating surface of the seating projection in the third space portion to close the second flow path, and wherein a sealing member is disposed on the seating surface of the ring-shaped seating projection such that the sealing member is interposed between the sub-valve body and the seating projection.

2. The branch tee of claim 1, wherein the sub-valve body is provided with a seating surface formed with a greater diameter than the fourth space portion to be seated on the seating projection, a sloped surface extending obliquely from an edge of the seating surface towards the connecting member, and a plurality of recesses formed along the edge of the seating surface.

3. The branch tee of claim 1, wherein, when the piston valve is in the first position, the sub-valve body is spaced apart from the seating projection in the third space portion.

4. The branch tee of claim 1, wherein the first flow path is formed through the inlet, the third space portion, the second space portion, the first space portion and the first outlet, but in an area where the main valve body is disposed, the first flow path is formed through a gap between the main valve body and an inner surface of the branch tee body.

5. The branch tee of claim 1, further comprising a spring interposed between the first end of the branch tee body and the main valve body.

6. The branch tee of claim 1, wherein a support pillar is protruded toward the main valve body at the first end of the branch tee body, and
   wherein the piston valve is provided with a coupling portion for slidably coupling with the support pillar.

7. The branch tee of claim 6, wherein the coupling portion is in a shape of a hole in which the support pillar is slidably coupled.

8. The branch tee of claim 6, wherein the coupling portion is in a shape of a pillar that is slidably coupled to a hole formed in the support pillar.

9. A sprinkler piping system, comprising:
   a branch tee according to claim 1;
   a closed-type sprinkler head connected to the first outlet of the branch tee via a pipe; and an open-type sprinkler head connected to the second outlet of the branch tee via a pipe, wherein, when the closed-type sprinkler head is opened, a change in fluid pressure within the branch tee causes the piston valve to move from the second position to the first position, thereby opening the second flow path while increasing the flow path cross-sectional area of the first flow path.

\* \* \* \* \*